United States Patent [19]
Bonorden et al.

[11] Patent Number: 5,871,803
[45] Date of Patent: Feb. 16, 1999

[54] SALT FLAVOR ENHANCING COMPOSITIONS, FOOD PRODUCTS INCLUDING SUCH COMPOSITIONS, AND METHODS FOR PREPARING SUCH PRODUCTS

[75] Inventors: William R. Bonorden, Moorestown; Denise A. Giordano, Jackson; Beverly L. Lee, Marlton; Harry M. Lukis, Collingswood, all of N.J.

[73] Assignee: Campbell Soup Company, Camden, N.J.

[21] Appl. No.: 865,964

[22] Filed: May 30, 1997

[51] Int. Cl.$^6$ .............................. A23L 1/30; A23L 1/237
[52] U.S. Cl. .......................... 426/649; 426/519; 426/806
[58] Field of Search .................................. 426/649, 599, 426/589, 806, 519, 665

[56] References Cited

U.S. PATENT DOCUMENTS

| | | | |
|---|---|---|---|
| Re. 27,981 | 4/1974 | Frank et al. | 99/143 |
| 1,874,055 | 8/1932 | Liebrecht | 426/649 |
| 1,998,179 | 4/1935 | Wolf | 426/649 |
| 2,299,999 | 10/1942 | Lippman, Jr. | 99/143 |
| 2,471,144 | 5/1949 | Davy | 99/143 |
| 2,824,008 | 2/1958 | Perri et al. | 99/143 |
| 2,829,056 | 4/1958 | Kimmerer | 426/649 |
| 3,505,082 | 4/1970 | Miller | 426/649 |
| 3,514,296 | 5/1970 | Frank et al. | 426/649 |
| 4,107,346 | 8/1978 | Kravitz | 426/648 |
| 4,243,691 | 1/1981 | Mohlenkamp, Jr. et al. | 426/649 |
| 4,471,002 | 9/1984 | Buckholz, Jr. et al. | 426/582 |
| 4,473,595 | 9/1984 | Rood et al. | 426/649 |
| 4,917,913 | 4/1990 | Buckholz, Jr. et al. | 426/536 |
| 4,931,305 | 6/1990 | Karppanen et al. | 426/649 |
| 4,963,387 | 10/1990 | Nakagawa et al. | 426/649 |
| 4,988,527 | 1/1991 | Buckholz, Jr. et al. | 426/536 |
| 5,034,378 | 7/1991 | Cox | 514/23 |
| 5,064,663 | 11/1991 | Murray et al. | 426/60 |
| 5,098,723 | 3/1992 | DuBois et al. | 426/96 |
| 5,098,724 | 3/1992 | DuBois et al. | 426/96 |
| 5,562,942 | 10/1996 | Koh et al. | 426/649 |
| 5,562,943 | 10/1996 | Koh et al. | 426/649 |
| 5,626,904 | 5/1997 | Frederiksen | 426/649 |

FOREIGN PATENT DOCUMENTS

| | | |
|---|---|---|
| 0190521 | 8/1988 | European Pat. Off. |
| 0297763 | 1/1989 | European Pat. Off. |
| 0636321 | 2/1995 | European Pat. Off. |
| 0441786 | 10/1995 | European Pat. Off. |
| 2493681 | 11/1981 | France . |
| 2906697 | 9/1979 | Germany . |
| 3144166 | 6/1982 | Germany . |
| 2015863 | 9/1979 | United Kingdom . |
| 2237720 | 4/1991 | United Kingdom . |
| WO9318668 | 3/1985 | WIPO . |
| 86105660 | 10/1986 | WIPO . |
| WO 90/00522 | 1/1990 | WIPO . |
| WO8500958 | 9/1993 | WIPO . |

*Primary Examiner*—Nina Bhat
*Attorney, Agent, or Firm*—Baker & Botts, L.L.P.

[57] ABSTRACT

A salt flavor enhancing composition consists essentially of a combination of sodium chloride and potassium chloride and a combination of magnesium chloride and magnesium sulfate Further, the composition may include a combination of sodium ions, chloride ions, potassium ions, magnesium ions, and sulfate ions. Food products including these compositions and methods for preparing such food products are encompassed.

49 Claims, No Drawings

SALT FLAVOR ENHANCING COMPOSITIONS, FOOD PRODUCTS INCLUDING SUCH COMPOSITIONS, AND METHODS FOR PREPARING SUCH PRODUCTS

BACKGROUND OF THE INVENTION

1. Field of the Invention

The present invention relates to salt flavor enhancing compositions, food products including such compositions, and methods for manufacturing such products. In particular, it relates to salt flavor enhancing compositions, which include sodium chloride (NaCl), i.e., salt, in combination with potassium chloride and at least two magnesium salts, such that the total amount of sodium is reduced without significant degradation of salt flavor. Further, it relates to salt flavor enhancing compositions, which include potassium chloride and at least two magnesium salts, that may be added to products having intrinsic sodium levels or targeted sodium levels.

2. Description of Related Art

Salt or table salt, as those terms have generally been used, is added to processed and cooked foods to provide palatability and a desirable salty taste. It chemically consists of approximately 60% elemental chlorine and approximately 40% elemental sodium, by weight. Sodium, an essential nutrient, plays a vital role in maintaining concentration and volume of extracellular fluid.

From a dietary perspective, the blood pressure of a specific individual may respond differently to various levels of sodium. Family history of blood pressure, weight, age, physical activity, alcohol intake, and overall dietary factors, such as dietary intake of calcium, potassium, sodium, and fiber all play a role in affecting blood pressure. Some scientific evidence suggests that a more balanced dietary intake of sodium, potassium, magnesium, and other cations may beneficially affect blood pressure. Individuals, whose blood pressure increases when sodium intake is high or decreases when sodium intake is low, are called "salt sensitive." For those salt sensitive individuals, a reduction in total dietary sodium in take may be warranted. This may be accomplished through the use of low and reduced sodium compositions and food products.

To aid in reducing the level of dietary sodium intake, several low salt or salt substitute products have been introduced into market. Such products may include up to about 50% by weight of sodium chloride with the remainder replaced by potassium chloride or a magnesium salt, or a combination thereof. However, these products provide only limited sodium reduction. In addition, both potassium and magnesium add bitter aftertastes to food products, which many consumers find unacceptable. Further, these salt substitutes are generally for direct use on foods and in cooking just as individuals might use table salt. No known salt substitute satisfactorily reduces sodium in thermally processed food products below levels currently being marketed.

In order to reduce the amount of sodium, compositions have been formulated in which sodium has been partly or wholly replaced by other substances, which imitate the taste of the salt. For the purpose of reducing the salt consumption and sodium intake, while maintaining a desired degree of salty taste, potassium chloride and ammonium chloride have been used as a partial replacement for salt. Nevertheless, as noted above, potassium chloride generates a particularly bitter and metallic taste, and when added to foods, it may severely spoil and impair their tastes. A variety of counter-measures have been proposed to eliminate the bitterness caused by the addition of potassium chloride; for example, calcium chloride or magnesium chloride have been added to some low-sodium salt compositions, such as those described in Japanese Patent Publication No. 20 15299/1985. However, these measures have not produced satisfactory results, especially in processed food products. In addition, ammonium chloride also produces a bitter aftertaste and, at cooking and baking temperatures, ammonium chloride may decompose, thereby changing the pH value, taste, and other properties of food products which contain it.

The use of small amounts of magnesium, calcium, formates, and citrates in salt substitute compositions consisting primarily of potassium chloride has been proposed to mask or overcome the bitter taste of the potassium. However, these additives may cause the loss of the true salty flavor or the taste sensation associated with salt and may unbalance or otherwise negatively affect the taste of prepared or processed food products.

Thus, replacing sodium chloride by other chemical compounds involves several disadvantages. Additives which mask or overcome the undesirable tastes, e.g., bitter or metallic tastes, of common salt substitutes including potassium or magnesium, or both, may also adversely affect the food product's taste and palatability. Further, there are relatively few approved food additives, such as magnesium sulfate, which may accomplish this masking role.

SUMMARY OF THE INVENTION

Therefore, a need has arisen for a salt flavor enhancing composition for use in or with food products to provide a pure, balanced, and non-bitter salt flavor, with a significantly reduced sodium content.

Accordingly, it is an object of this invention to provide a salt flavor enhancing composition consisting essentially of sodium chloride in a sufficient amount to promote a salty taste, potassium chloride in sufficient amount to reduce the sodium content of the composition while enhancing the salty taste, and a combination of two magnesium salts: magnesium chloride and magnesium sulfate, in sufficient amounts to mask or overcome the bitter and metallic taste of the potassium, to further enhance salty taste of the mixture and to provide a dietary potassium supplement and to provide a dietary magnesium supplement.

It is a further object of the present invention to provide a salt flavor enhancing composition which may be used topically and in the preparation of food products, eg., soups and vegetable juices, consisting essentially of sodium chloride, potassium chloride, and the pair of magnesium salts in a constituent ratio combination, such that the resulting seasoning substitute retains the balanced, salty taste associated with sodium chloride and does not result in a bitter or metallic aftertastes associated with salt substitute compositions containing potassium chloride.

It is still another object of this invention to provide a salt flavor enhancing composition including predetermined concentrations of sodium ions, chloride ions, potassium ions, magnesium ions, and sulfate ions. Moreover, it is an object of this invention to produce food products for delivering these relative ion concentrations to consumers.

In an embodiment of the invention, a salt flavor enhancing composition comprises about 25 to about 255 millimoles per liter of sodium ions, about 50 to about 325 millimoles per liter of chloride ions, about 8.5 to about 100 millimoles per liter of potassium ions, about 1.4 to about 15 millimoles per liter of magnesium ions, and about 0.2 to about 3.5 millimoles per liter of sulfate ions.

In a further embodiment, the invention is a food product comprising a combination of a sodium ions, chloride ions, potassium ions, magnesium ions, and sulfate ions in the concentration ranges described above.

In another embodiment of the invention, a salt flavor enhancing composition again comprises concentrations of sodium ions, chloride ions, potassium ions, magnesium ions, and sulfate ions. The ratios of the sodium ions to the chloride, potassium, magnesium and sulfate ions, respectively, may fall within predetermined ranges. For example, a first ratio of the sodium ions to the chloride ions is in a range of about 4.5:1 to about 0.1 :1; a second ratio of the sodium ions to the potassium ions is in a range of about 30:1 to about 0.2:1; a third ratio of the sodium ions to the magnesium ions is in a range of about 175:1 to about 1.5:1; and a fourth ratio of the sodium ions to the sulfate ions is in a range of about 850:1 to about 8:1.

In still a further embodiment, the invention is a food product again comprising a combination of concentrations of sodium ions, chloride ions, potassium ions, magnesium ions, and sulfate ions. The ratios of these the sodium ions to the chloride, potassium, magnesium and sulfate ions, respectively, may fall within the predetermined ranges, described above.

In yet another embodiment of the invention, a salt flavor enhancing composition may consist essentially of a combination of sodium chloride (NaCl) and potassium chloride (KCl) in a weight percentage in a range of about 75 to 98 percent and a combination of magnesium chloride (MgCl$_2$) and magnesium sulfate (MgSO$_4$) in a weight percentage in a range of about 2 to 25 percent. Weight percentages disclosed herein are based on the use of magnesium chloride hexahydrate and "anhydrous" magnesium sulfate. Magnesium chloride hexahydrate is prepared from magnesium ammonium chloride hexahydrate in the presence of hydrochloric acid (HCL). Further, commercially available "anhydrous" magnesium sulfate may contain an average of three or fewer, e.g., 2.5, water molecules per magnesium chloride molecule. Nevertheless, in view of the detailed description and examples which follow, it will be understood by persons of ordinary skill in the art that both hydrous and anhydrous forms of these salts may be used in this invention as described in the following claims.

In still another embodiment, the invention is a salt flavor enhancing composition for use in a food product containing a predetermined sodium chloride content, i.e., a sodium chloride target amount or an intrinsic sodium chloride amount, which may consist essentially of a combination of about 66 percent by weight of potassium chloride and of about 34 percent by weight of a combination of magnesium chloride and magnesium sulfate.

In yet a further embodiment of the invention, a method for preparing a food product including a salt flavor enhancing composition may comprise the steps of measuring a first concentration of sodium ions in components of the food product before adding the composition to the food product and adding a quantity of the composition, such that the food product comprises about 50 to about 325 millimoles per liter of chloride ions, about 8.5 to about 100 millimoles per liter of potassium ions, about 1.4 to about 15 millimoles per liter of magnesium ions, and about 0.2 to about 3.5 millimoles per liter of sulfate ions. The method includes the further step of adding a source of sodium ions, such that the food product comprises about 25 to about 255 millimoles per liter of sodium ions.

In an additional embodiment of the invention, a method for preparing a food product including a salt flavor enhancing composition may comprise the steps of measuring a concentration of sodium ions in the food product before adding the composition to the food product and adding a source of sodium ions, such that the ratios of the sodium ions to the chloride, potassium, magnesium and sulfate ions, respectively, may fall within predetermined ranges. For example, a first ratio of the sodium ions to the chloride ions is in a range of about 4.5:1 to about 0.1:1; a second ratio of the sodium ions to the potassium ions is in a range of about 30:1 to about 0.2:1; a third ratio of the sodium ions to the magnesium ions is in a range of about 175:1 to about 1.5:1; and a fourth ratio of the sodium ions to the sulfate ions is in a range of about 850:1 to about 8:1.

Other objects, features, and technical advantages will be apparent to persons skilled in the art in view of the following detailed description of preferred embodiments.

DETAILED DESCRIPTION OF PREFERRED EMBODIMENTS

In a preferred embodiment of the invention, a salt flavor enhancing composition may comprise a combination of sodium ions, chloride ions, potassium ions, magnesium ions, and sulfate ions. This composition may provide these ionic species in the following concentrations:

TABLE I

| Ionic Species | Concentration Range (millimoles per liter) |
| --- | --- |
| Sodium | 30 to 250 |
| Chloride | 55 to 320 |
| Potassium | 10 to 95 |
| Magnesium | 1.5 to 14 |
| Sulfate | 0.3 to 3 |

In a more preferred embodiment, this composition may provide these ionic species in the following concentrations:

TABLE II

| Ionic Species | Concentration Range (millimoles per liter) |
| --- | --- |
| Sodium | 54 to 200 |
| Chloride | 103 to 257 |
| Potassium | 18 to 76 |
| Magnesium | 2 to 11 |
| Sulfate | 0.6 to 2.4 |

In another embodiment of the invention, a salt flavor enhancing composition again comprises concentrations of sodium ions, chloride ions, potassium ions, magnesium ions, and sulfate ions. However, a first ratio of the sodium ions to the chloride ions is in a range of about 5:1 to about 0.1:1; a second ratio of the sodium ions to the potassium ions is in a range of about 25:1 to about 0.3:1; a third ratio of the sodium ions to the magnesium ions is in a range of about 165:1 to about 2:1; and a fourth ratio of the sodium ions to the sulfate ions is in a range of about 830:1 to about 10:1.

In a preferred embodiment of this composition, the first ratio of the sodium ions to the chloride ions may be in a range of about 1.9:1 to about 0.2:1; the second ratio of the sodium ions to the potassium ions may be in a range of about 11.1:1 to about 0.7:1; the third ratio of the sodium ions to the magnesium ions may be in a range of about 100:1 to about 4.9:1; and the fourth ratio of the sodium ions to the sulfate ions may be in a range of about 333.3:1 to about 22.5:1.

A salt flavor enhancing composition also may consist essentially of a mixture of sodium chloride and potassium chloride, which may be in a range of about 75 to about 98 percent by weight of the composition, and a combination of two magnesium salts, eg., magnesium chloride hexahydrate and anhydrous magnesium sulfate, which may be in a range of about 2 to 25 percent by weight of the composition. Such compositions may be added to food products, such as vegetable drinks, gravies, breads, biscuits, crackers, pickles, meats and meat products, wet and dry soups, dairy products, and the like, to enhance the perceived salt content and salt flavor of the food product and to produce food products with a reduced sodium content. For example, an embodiment of the composition may consist essentially of the following components:

TABLE VI

| Element | % range (by weight) |
|---|---|
| NaCl | 40.0 to 75.0 |
| KCl | 16.0 to 50.0 |
| $MgCl_2$ | 1.3 to 20.0 |
| $MgSO_4$ | 0.7 to 5.0 |
| | 100.0 |

In a first more preferred embodiment, the weight percentage of the combination of $MgCl_2$ and $MgSO_4$ is about 5 to 15 percent. For example, this preferred embodiment of the composition may consist essentially of the following components:

TABLE VA

| Element | % range (by weight) |
|---|---|
| NaCl | 40 to 75 |
| KCl | 18 to 48 |
| $MgCl_2$ | 4 to 12 |
| $MgSO_4$ | 1 to 3 |
| | 100.0 |

In a second more preferred composition, suitable for topical food applications in the form of a dry mixture, the weight percentage of NaCl and KCl is about 86 percent and the weight percentage of $MgCl_2$ and $MgSO_4$ is about 14 percent. For example, this more preferred embodiment of the composition may consist of the following components:

TABLE VB

| Element | % range (by weight) |
|---|---|
| NaCl | 50.0 |
| KCl | 36.0 |
| $MgCl_2.6H_2O$ | 11.6 |
| $MgSO_4$ | 2.4 |
| | 100.0 |

In another more preferred composition, the weight percentage of NaCl and KCl is about 82.82 percent and the weight percentage of $MgCl_2$ and $MgSO_4$ is about 17.17 percent. For example, this more preferred embodiment of the composition may comprise the following components:

TABLE VI

| Element | % range (by weight) |
|---|---|
| NaCl | 41.1 |
| KCl | 41.1 |
| $MgCl_2.6H_2O$ | 14.14 |
| $MgSO_4$ | 3.04 |
| | 100.00 |

In still another preferred embodiment of the composition, the ratio of $MgCl_2$ to $MgSO_4$ may be in a range of about 1.7:;1 to about 10:1 by weight percentage. In yet a more preferred embodiment, the ratio of $MgCl_2$ to $MgSO_4$ may be in a range of about 1.7:1 to about 7:1 by weight percentage.

In yet another embodiment of the invention, the composition may consist essentially of about 66% by weight of potassium chloride and about 34% by weight of a combination of $MgCl_2$ and $MgSO_4$. This three element combination may be added to food products which already contain a targeted sodium chloride content or which contain a naturally high, intrinsic sodium chloride content. For example, a food product with a targeted sodium chloride content may be produced to provide a fixed sodium amount per serving size. This three element form of the composition allows the application of the composition to food products otherwise unsuitable for the addition of sodium chloride. However, this composition may be added to such food products to deliver desired amounts of potassium and the magnesium salts. Moreover, in some food products, the final concentrations of sodium chloride and potassium chloride may be adjusted, on a product specific basis, to deliver the desired salty flavor according to the weight percentages ion concentrations, or ion ratios disclosed above in TABLES I–VI. For example, in an embodiment of such a composition, the composition may comprise the following components:

TABLE VII

| Element | % (by weight) |
|---|---|
| KCl | 65.94 |
| $MgCl_2.6H_2O$ | 28.20 |
| $MgSO_4$ | 5.86 |
| | 100.0 |

The salt flavor enhancing composition may be manufactured in 227 to 452 kg. batches by mixing the magnesium chloride with the sodium chloride under conditions of constant agitation, such as may be provided by a Patterson Kelly Blender with an intensifier bar. Such blenders are commercially available from Patterson-Kelly Co., East Stroudsburg, Pa., U.S.A. However, other commercially available dry material blenders or mixing means for providing constant mechanical agitation also are suitable. Next, the magnesium sulfate is added to the mixture of sodium chloride and magnesium chloride. Finally, the potassium chloride is added to the mixture of sodium chloride, magnesium chloride, and magnesium sulfate. The mixture of components may be agitated for an additional period of time, e.g., about 10 minutes, to ensure homogeneity. Generally, the ingredients may be mixed in any order. However, when hydrous magnesium chloride is used, the most hygroscopic salt may be added first to the sodium chloride to facilitate blending. Although the basic composition may contain only four elements, it may not be desirable to use the composition in such a basic form in all food products. For example, anticaking agents may also be added to the formulation.

Food products may include a combination of sodium ions, chloride ions, potassium ions, magnesium ions, and sulfate ions. These ionic species may be supplied by various combination of salts, such as a combination consisting essentially of sodium chloride, potassium chloride, magnesium chloride, and magnesium sulfate. Moreover, such combinations may be added to the food product to provide the desired ion concentrations, or some portion of the concentrations of the ionic species may be supplied by components of the food product, eg., sodium or potassium ions naturally occurring meats, fruits, or vegetables. In particular, the sodium ion concentration is in a range of about 25 to about 250 millimoles per liter. The chloride ion concentration is in a range of about 50 to about 320 millimoles per liter. The potassium ion concentration is in a range of about 10 to about 95 millimoles per liter. The magnesium ion concentration is in a range of about 1.5 to about 14 millimoles per liter. Finally, the sulfate ion concentration is in a range of about 0.3 to about 3.0 millimoles per liter.

In a more preferred embodiment of such food products, the sodium ion concentration may be in a range of about 54 to about 200 millimoles per liter, the chloride ion concentration may be in a range of about 103 to about 257 millimoles per liter, the potassium ion concentration may be in a range of about 18 to about 76 millimoles per liter, the magnesium ion concentration may be in a range of about 2 to about 11 millimoles per liter, and the sulfate ion concentration may be in a range of about 0.6 to about 2.4 millimoles per liter.

In another embodiment of food products according to this invention, the food products again may comprise a combination of sodium ions, chloride ions, potassium ions, magnesium ions, and sulfate ions. However, a first ratio of the sodium ions to the chloride ions is in a range of about 5:1 to about 0.1:1. A second ratio of the sodium ions to the potassium ions is in a range of about 25:1 to about 0.3:1. A third ratio of the sodium ions to the magnesium ions is in a range of about 165:1 to about 2:1. Finally, a fourth ratio of the sodium ions to the sulfate ions is in a range of about 830:1 to about 10:1.

In a preferred embodiment of this food product, the first ratio of the sodium ions to the chloride ions may be in a range of about 1.9:1 to about 0.2:1; a second ratio of the sodium ions to the potassium ions may be in a range of about 11.1:1 to about 0.7:1; a third ratio of the sodium ions to the magnesium ions may be in a range of about 100:1 to about 4.9:1; and a fourth ratio of the sodium ions to the sulfate ions may be in a range of about 333.3:1 to about 22.5:1.

A method for preparing food products including a plurality of food components, such as water, sugar, and spices, and a salt flavor enhancing composition may comprise the steps of measuring a concentration of sodium ions in the food product components before the addition of a salt flavor enhancing composition and adding a quantity of the composition, such that the food products comprise a combination of chloride ions, potassium ions, magnesium ions, and sulfate ions. As noted above, the chloride ions are in a range of about 55 to about 320 millimoles per liter. The potassium ions are in a range of about 10 to about 95 millimoles per liter. The magnesium ions are in a range of about 1.5 to about 14 millimoles per liter. Finally, the sulfate ions are in a range of about 0.3 to about 3 millimoles per liter. The method may include the further step of adding a source of sodium ions, such that the first concentration is in a range of about 30 to about 250 millimoles per liter.

In another method for preparing such food products, the method may comprise the steps of measuring a first concentration of sodium ions in the food components before adding the salt flavor enhancing composition and adding a source of sodium ions, such that the first concentration is in a range of about 30 to about 250 millimoles per liter. The method may comprise the further step of adding a quantity of a composition consisting essentially of potassium chloride, magnesium chloride, and magnesium sulfate, such that the food products also comprise a combination of chloride ions, potassium ions, magnesium ions, and sulfate ions. A first ratio of the sodium ions to the chloride ions is in a range of about 5:1 to about 0.1:1. A second ratio of the sodium ions to the potassium ions is in a range of about 25:1 to about 0.3:1. A third ratio of the sodium ions to the magnesium ions is in a range of about 165:1 to about 2:1. Finally, a fourth ratio of the sodium ions to the sulfate ions is in a range of about 830:1 to about 10:1.

Regardless of the embodiment, the invention employs a combination of two magnesium salts: magnesium chloride and magnesium sulfate, to reduce or eliminate the bitterness and metallic aftertaste imparted by potassium and the bitterness imparted by magnesium and to achieve an enhanced salt taste from the composition. The taste achieved by the composition is superior to that achieved in known compositions using one of the magnesium salts or compositions containing a combination of magnesium salts outside of the disclosed weight ranges.

While not wishing to be bound by a theory, it is believed that the advantageous results of the invention are obtained because the combination of magnesium chloride and magnesium sulfate supplies dissociable forms of magnesium, chloride and sulfate in critical ratios that provide a synergistic effect that enhance salt flavor and reduce the unpleasant aftertastes associated with potassium chloride.

As noted above, potassium produces a bitter and metallic aftertaste that can negatively impact the salty taste produced by potassium chloride-containing mixtures. The presence of magnesium reduces the metallic aftertaste introduced by the potassium, while the additional chloride increases the salty flavor of the composition. The magnesium sulfate provides a dissociable form of the sulfate anion which further reduces the metallic and bitter aftertastes associated with potassium and enhances and prolongs the salt flavor imparted by the invention. The presence of sulfate anions appears critical to the efficacy of the invention. It is believed that the superior taste is due to the presence of the relatively small, but significant, amount of sulfate anions in conjunction with the other components of the invention. Further, this effect of the presence of the sulfate anions has only been realized within the relatively narrow range of $MgCl_2:MgSO_4$ ratios, as disclosed herein.

The invention may be more fully understood by consideration of the following examples, which are intended to be purely exemplary of the invention. Further, the unexpected results described above and revealed by the following examples are exemplary of the performance of embodiments of the present invention.

EXAMPLES

In the first example, a series of nine salt flavor enhancing compositions were prepared and added to a chicken broth to prepare nine 150 ml testing batches. Each broth batch contained about 0.375 percent total NaCl by weight, i.e., about 360 mg sodium per serving, and about 0.205 percent by weight of KCl. The total NaCl concentration represents the sum of added NaCl and NaCl derived from the chicken flavors and chicken stock. The remaining portion of the composition comprised about 13% by weight of a combination of $MgCl_2$ and $MgSO_4$, such that about 0.085% by weight of the broth represented the combination of $MgCl_2$ and $MgSO_4$. The magnesium salt compositions of the broth batches (B 1–B9) are as follows:

TABLE VIII

| Batch | $MgCl_2$ (%) | $MgSO_4$ (%) | $MgCl_2$:$MgSO_4$ |
|---|---|---|---|
| B1 | 0.085 | 0 | 1:0 |
| B2 | 0.075 | 0.01 | 7:1 |
| B3 | 0.064 | 0.021 | 3:1 |
| B4 | 0.054 | 0.032 | 1.7:1 |
| B5 | 0.043 | 0.043 | 1:1 |
| B6 | 0.032 | 0.054 | 1:1.7 |
| B7 | 0.021 | 0.064 | 1:3 |
| B8 | 0.01 | 0.075 | 1:7 |
| B9 | 0 | 0.985 | 0:1 |

Each batch was tasted by three to five persons, its flavor assessed by consensus, and the presence or absence of any aftertaste was noted. Batch B1, which contained only $MgCl_2$, initially provided a salty taste, but was followed by a bitter aftertaste. Similarly, batch B9, which contained only $MgSO_4$, left a very astringent, bitter taste and had a relatively low salt impact. The most palatable tastes and the most desirable salt flavors were obtained from batches B2–B4. The taste of batch B2 provided sweet meaty notes with a salty flavor. The taste of batch B3 was similar to that of batch B2, but with a more salty flavor. Finally, batch B4 was described as having a bone stock flavor and slightly less salt flavor than B3. Samples B5–B8 were astringent and bitter with other undesirable flavor characteristics. Thus, the preferred ratio of $MgCl_2$ to $MgSO_4$ is in a range of about 1.7:1 to about 7:1.

In a second example, a series of six salt flavor enhancing compositions were prepared and added to a chicken broth to prepare six 400 gram testing batches. Each broth batch contained about 0.375 percent by weight of NaCl, i.e., about 360 mg sodium per serving, and about 0.205 percent by weight of KCl. The remaining portion of the compositions comprised a combination of $MgCl_2$ and $MgSO_4$, such that the weight percentage of this combination in the six batches varied between about 5 and 35% by weight. The ratio of $MgCl_2$ to $MgSO_4$ was maintained at 4.7:1. The broths were thermally processed according to a standard procedure, e.g., at about 121° C. for about 30 minutes. The magnesium salt compositions of the broth batches (B15–B20) are as follows:

TABLE IX

| Batch | Mg Salts | % Mg Salts | $MgCl_2$:$MgSO_4$ |
|---|---|---|---|
| B15 | 0.031 | 5 | 4.7:1 |
| B16 | 0.058 | 9 | 4.7:1 |
| B17 | 0.085 | 13 | 4.7:1 |
| B18 | 0.196 | 25 | 4.7:1 |
| B19 | 0.250 | 30 | 4.7:1 |
| B20 | 0.310 | 35 | 4.7:1 |

Each batch again was tasted by three to five persons, its flavor was assessed by consensus, and the presence or absence of an aftertaste was noted. The most palatable tastes and the most desirable salt flavors were obtained from batches B16 and B17. A control batch containing only NaCl (0.375 percent by weight) and KCl (0.205 percent by weight) produced a metallic aftertaste. Batch B15 produced a saltier taste than the control batch but still produced a pronounced bitter and metallic aftertaste. The taste of batch B16 was more saline and less metallic than batch B15. The taste of batch B17 was more saline and less metallic than batch B16. B18–B20 were extremely bitter. Thus, in the 360 mg sodium per serving broth matrix, the preferred range of magnesium salts in the composition is between about 5 and 26 percent by weight with a more preferred range of about 9 to 13 percent by weight.

In a third example, a series of four salt flavor enhancing compositions were prepared and added to a chicken broth to prepare four 300 gm testing batches to further define the preferred magnesium salt efficacy range. Each broth batch contained about 0.375 percent by weight of NaCl, i.e., about 360 mg sodium per serving, and about 0.273 percent by weight of KCl. The remaining portion of the compositions comprised a combination of $MgCl_2$ and $MgSO_4$, such that the weight percentage of this combination in the six batches varied between about 9 and 18 percent by weight. The ratio of $MgCl_2$ to $MgSO_4$ was maintained at 4.7:1. The broths were thermally processed according to a standard procedure, e.g., at about 121° C. for about 30 minutes. The magnesium salt compositions of the broth batches (B221–B224) are as follows:

TABLE X

| Batch | Mg Salts | % Mg Salts | $MgCl_2$:$MgSO_4$ |
|---|---|---|---|
| B221 | 0.060 | 9 | 4.7:1 |
| B222 | 0.085 | 12 | 4.7:1 |
| B223 | 0.105 | 15 | 4.7:1 |
| B224 | 0.130 | 18 | 4.7:1 |

Batch B221 produced a clean, balance salt flavor more intense than B222, while B224, though very salty, had a slight savory flavor and subtle astringency. Thus, in the 360 mg sodium per serving chicken broth matrix, a more preferred range of total magnesium salts in the composition is between about 12 and 15 percent by weight.

In a fourth example, a series of four salt flavor enhancing compositions were prepared and added to a chicken broth to prepare four 400 gram testing batches to further define the preferred $MgCl_2$:$MgSO_4$ ratios. Each broth batch contained about 0.375 percent by weight of NaCl, i.e., about 360 mg sodium per serving, and about 0.273 percent by weight of KCl. The remaining portion of the compositions comprised a combination of $MgCl_2$ and $MgSO_4$, such that the ratio of $MgCl_2$ to $MgSO_4$ was varied between 1:1 and 7:1, at a total magnesium salt concentration of about 14 percent. The broths were thermally processed according to a standard procedure, e.g., at about 121° C. for about 30 minutes. The magnesium salt compositions of the broth batches are as follows:

TABLE XI

| Batch | $MgCl_2$ (%) | $MgSO_4$ (%) | $MgCl_2$:$MgSO_4$ |
|---|---|---|---|
| B225 | 0.092 | 0.013 | 7:1 |
| B227 | 0.088 | 0.017 | 5:1 |
| B229 | 0.079 | 0.026 | 3:1 |
| B231 | 0.053 | 0.053 | 1:1 |

Batch B225 was extremely salty with a slightly weak chicken flavor. B227 was extremely salty, thought slightly less salty than B225, and had the most balance overall flavor. B227 provided a balanced savory, salty, chicken broth flavor profile. B229 was slightly less salty and more savory than B227, while B231 developed a strong savory and brown flavor and was less salty than B229. B227, with the 5:1 ratio of $MgCl_2$:$MgSO_4$, was considered the superior sample.

Broth examples one and two demonstrate that the preferred total magnesium salt range for the composition, as applied to chicken broth containing approximately 360 mg of sodium per serving, is about 5–26 weight percent, with the preferred ratios of $MgCl_2$:$MgSO_4$ being about 1.7:1 to 7:1. Examples three and four demonstrate that the more preferred total magnesium salt range for the composition, as applied to chicken broth containing about 360 mg of sodium per serving, is about 12 to 15 weight percent, with the more preferred ratio of $MgCl_2$:$MgSO_4$ being about 5:1. Examples two and four demonstrate that the importance of the ratio of $MgCl_2$ to $MgSO_4$ to the efficacy of the composition.

In a fifth example, a series of seven salt flavor enhancing compositions were prepared and added to tomato juice to prepare seven 400 gram testing batches to define the preferred magnesium salt efficacy range. Each juice batch contained about 0.375 percent by weight of NaCl, i.e., about 360 mg sodium per serving, and about 0.246 percent by weight of KCl. The remaining portion of the compositions comprised a combination of $MgCl_2$ and $MgSO_4$, such that the weight percentage of this combination in the seven batches varied between about 5 and 35 percent by weight. The ratio of $MgCl_2$ to $MgSO_4$ was maintained at 4.7:1. The magnesium salt compositions of the juice batches (TJ15–TJ21) are as follows:

TABLE XII

| Batch | Mg Salts | % Mg Salts | $MgCl_2$:$MgSO_4$ |
|---|---|---|---|
| TJ15 | 0.032 | 5 | 4.7:1 |
| TJ16 | 0.062 | 9 | 4.7:1 |
| TJ17 | 0.102 | 14 | 4.7:1 |
| TJ18 | 0.146 | 19 | 4.7:1 |
| TJ19 | 0.208 | 25 | 4.7:1 |
| TJ20 | 0.256 | 30 | 4.7:1 |
| TJ21 | 0.334 | 35 | 4.7:1 |

Batch TJ15 was salty and good with a slight pasty mouth feel. TJ16 was more salty than TJ15 with some sweet and sour notes, and an intense salty aftertaste with no pasty mouth feel. TJ17 was more salty than TJ16, but was slightly harsh. TJ18 was saltier than TJ17, but had a slight pasty mouth feel. TJ19 was similar to TJ18 regarding saltiness, but lacked the pasty mouth feel. TJ20 and TJ21 were very salty with a strong pasty mouth feel. TJ16 and TJ17 were considered to have a superior salt and overall flavor, while TJ19 was considered the saltiest sample by the majority of tasters. The experiment was repeated with processed tomato juice, again samples TJ16 and TJ19 were the most preferred juices for saltiness and flavor. Thus, the preferred total weight percentage magnesium salt range in composition added to the tomato juice is about 5 to 25 percent.

In a sixth example, a series of four salt flavor enhancing compositions were prepared and added to tomato juice to prepare four 400 gram testing batches to define a more preferred total magnesium salt efficacy range. Each juice batch contained about 0.375 percent by weight of NaCl, i.e., about 360 mg sodium per serving, and about 0.246 percent by weight of KCl. The remaining portion of the compositions comprised a combination of $MgCl_2$ and $MgSO_4$, such that the weight percentage of this combination in the four batches varied between about 9 and 15% by weight. The ratio of $MgCl_2$ to $MgSO_4$ was maintained at 4.7:1. The magnesium salt compositions of the juice batches (TJ31–TJ34) are as follows:

TABLE XIII

| Batch | Mg Salts | % Mg Salts | $MgCl_2$:$MgSO_4$ |
|---|---|---|---|
| TJ31 | 0.062 | 9 | 4.7:1 |
| TJ32 | 0.080 | 11 | 4.7:1 |
| TJ33 | 0.096 | 13 | 4.7:1 |
| TJ34 | 0.114 | 15 | 4.7:1 |

All samples exhibited salt flavor enhancement with TJ31 and TJ32 providing a superior overall salt and flavor balance. Thus, a more preferred total magnesium salt weight percent range in the composition added to a 360 mg sodium per serving tomato juice is about 9 to 11 percent.

In a seventh example, a series of nine salt flavor enhancing compositions were prepared and added to a tomato juice to prepare nine 400 ml testing batches. Each juice batch contained about 0.375 percent by weight of NaCl, i.e., about 360 mg sodium per serving, and about 0.246 percent by weight of KCl. The remaining portion of the composition comprised about 14 percent by weight of a combination of $MgCl_2$ and $MgSO_4$, such that about 0.102 percent by weight of the juice represented the combination of $MgCl_2$ and $MgSO_4$. The magnesium salt compositions of the juice batches (TJ22–TJ30) are as follows:

TABLE XIV

| Batch | $MgCl_2$ (%) | $MgSO_4$ (%) | $MgCl_2$:$MgSO_4$ |
|---|---|---|---|
| TJ22 | 0.102 | 0 | 1:0 |
| TJ23 | 0.089 | 0.013 | 7:1 |
| TJ24 | 0.077 | 0.025 | 3:1 |
| TJ25 | 0.064 | 0.038 | 1.7:1 |
| TJ26 | 0.051 | 0.051 | 1:1 |
| TJ27 | 0.038 | 0.064 | 1:1.7 |
| TJ28 | 0.025 | 0.077 | 1:3 |
| TJ29 | 0.013 | 0.089 | 1:7 |
| TJ30 | 0 | 0.102 | 0:1 |

Batch TJ22 had a low salt flavor with no lingering saline impact and was noted as being slightly metallic. TJ23 was more salty and balanced than TJ22 with a more prolonged saline after taste. TJ24 was even more salty than TJ22 with a nice flavor balance, but the salt impact was slightly harsh. TJ25 was also very salty but also slightly harsh. Samples TJ26–TJ30 were considered harsh and astringent by the majority of tasters. Samples TJ23–TJ24 were considered the superior samples for salt and overall flavor with the saltiest tasting sample being TJ24 and TJ25. Thus, in a composition added to tomato juice having about 14 percent by weight of magnesium salts, the preferred ratio range of $MgCl_2$:$MgSO_4$ is about 1.7:1 to 7:1, with a more preferred ratio being about 3:1 to 7:1.

In an eighth example, a series of four salt flavor enhancing compositions were prepared and added to a tomato juice to prepare nine 400 ml testing batches. Each juice batch contained about 0.375 percent by weight of NaCl, i.e., about 360 mg sodium per serving, and about 0.246 percent by weight of KCl. The remaining portion of the composition comprised about 9 percent by weight of a combination of $MgCl_2$ and $MgSO_4$, such that about 0.062 percent by weight of the juice represented the combination of $MgCl_2$ and $MgSO_4$. The juice batches were thermally processed according to a standard procedure, e.g., at about 121° C. for about 45 seconds. The magnesium salt compositions of the juice batches (TJ47–TJ50) are as follows:

TABLE XV

| Batch | MgCl$_2$ (%) | MgSO$_4$ (%) | MgCl$_2$:MgSO$_4$ |
|---|---|---|---|
| TJ47 | 0.054 | 0.008 | 7:1 |
| TJ48 | 0.051 | 0.011 | 5:1 |
| TJ49 | 0.041 | 0.021 | 3:1 |
| TJ50 | 0.031 | 0.031 | 1:1 |

Batches TJ48 and TJ49 produced a superior flavor balance and salt flavor, with TJ49 being the saltiest sample. TJ47 was also very salty, but had a slight astringency and subtle harshness, and TJ50 had a flat flavor profile and had the least salty flavor. Thus, at 9 percent total magnesium salts in the composition added to a 360 mg sodium tomato juice matrix, the preferred ratio range of MgCl$_2$:MgSO$_4$ is about 3:1 to 7:1, with a more preferred ratio being about 3:1.

In an ninth example, the salt flavor enhancing composition was added to a processed tomato-based vegetable drink.

TABLE XVI

| Ingredient | Weight % |
|---|---|
| Tomato paste | 11.00 |
| Vegetable juice concentrate | 3.35 |
| Spices and flavor modifiers | 0.16 |
| Sugar | 0.12 |
| Salt enhancer | 0.66 |
| Water | 84.71 |
| | 100.0 |

The salt flavor enhancing composition consisted of 51.16 percent by weight of NaCl, 34.52 percent by weight of KCl, 11.79 percent by weight of MgCl$_2$, and 2.54 percent by weight of MgSO$_4$. About 6.63 grams of the composition was used to replace about 6.46 grams of NaCl in a 1000 g batch. The drink batch was thermally processed according to a standard procedure, e.g., at about 121° C. for about 45 seconds. The substitution reduced the total sodium from about 640 to about 360 mgs per serving, a 43 percent reduction. However, no bitter or metallic aftertaste was detected.

In a tenth example, the salt flavor enhancing composition was added to a processed tomato juice.

TABLE XVII

| Ingredient | Weight % |
|---|---|
| Tomato paste | 12.80 |
| Spices and flavor modifiers | 0.16 |
| Salt enhancer | 0.64 |
| Water | 86.40 |
| | 100.0 |

The salt flavor enhancing composition consisted of 53.19 percent by weight of NaCl, 33.05 percent by weight of KCl, 11.35 percent by weight of MgCl$_2$, and 2.41 percent by weight of MgSO$_4$. About 6.37 gm of the composition was used to replace about 6.46 gm of NaCl in a 1000 gm batch. The substitution reduced the total sodium from about 640 mg to about 360 mg per serving, a 43 percent reduction. However, no bitter or metallic aftertaste was detected.

In an eleventh example, the salt flavor enhancing composition was added to a frozen chicken soup.

TABLE XVIII

| Ingredient | Weight % |
|---|---|
| Chicken stock | 6.75 |
| Spices and Flavor Modifier | 0.23 |
| Sugar | 0.25 |
| Flour | 11.00 |
| Vegetables | 8.00 |
| Noodles | 19.00 |
| Salt enhancer | 1.58 |
| Water | 53.19 |
| | 100.0 |

The salt flavor enhancing composition consisted of 71.3 percent by weight of NaCl, 22.2 percent by weight of KCl, 5.4 percent by weight of MgCl$_2$, and 1.1 percent by weight of MgSO$_4$. About 15.84 grams of the composition was used to replace about 17.70 grams of NaCl in a 1000 g batch. The substitution reduced the total sodium from about 870 mg to about 600 mg per serving, about a 30% reduction. However, no bitter or metallic aftertaste was detected.

Other embodiments of the invention will be apparent to those skilled in the art from a consideration of this specification or practice of the invention disclosed herein. It is intended that the specification and these examples be considered as exemplary only. Although the present invention has been described in connection with preferred embodiments, the invention is not limited thereto. For example, the composition may also consist of salts in different hydration states, or salts capable of delivering similar molar ratios of sodium, potassium, chloride, magnesium, and sulfate as those realized through the examples describing the embodiments of this invention. Similarly, modification of embodiments by the addition of trace compounds or modifiers, such as, but not limited to, natural and artificial sweeteners, commercially available flavor modifiers or maskers, organic acids and their salts, sulfates and chelating agents, sweetness modifiers, nutritional supplements, and the like, are with the scope of the claims which follow.

We claim:

1. A salt flavor enhancing composition comprising about 25 to about 255 millimoles per liter of sodium ions, about 50 to about 325 millimoles per liter of chloride ions, about 8.5 to about 100 millimoles per liter of potassium ions, about 1.4 to about 15 millimoles per liter of magnesium ions, and about 0.2 to about 3.5 millimoles per liter of sulfate ions.

2. The composition of claim 1, wherein a ratio of sodium ions to chloride ions is from about 4.5:1 to about 0.1:1; a ratio of sodium ions to potassium ions is from about 30:1 to about 0.3:1; a ratio of sodium ions to magnesium ions is from about 175:1 to about 1.5:1; and a ratio of sodium ions to sulfate ions is from about 850:1 to about 8:1.

3. The composition of claim 1, wherein sodium ions are present at a concentration of about 30 to about 250 millimoles per liter, chloride ions are present at a concentration of about 55 to about 320 millimoles per liter, potassium ions are present at a concentration of about 10 to about 95 millimoles per liter, magnesium ions are present at a concentration of about 1.5 to about 14 millimoles per liter, and sulfate ions are present at a concentration of about 0.3 to about 3 millimoles per liter.

4. The composition of claim 3, wherein the ratio of sodium ions to chloride ions is from about 5:1 to about 0.1:1; the ratio of sodium ions to potassium ions is from about 25:1 to about 0.3:1; the ratio of sodium ions to magnesium ions is from about 165:1 to about 2:1; and the ratio of sodium ions to sulfate ions is from about 830:1 to about 10:1.

5. The composition of claim 1, wherein sodium ions are present at a concentration of about 54 to about 200 millimoles per liter, chloride ions are present at a concentration of about 103 to about 257 millimoles per liter, potassium ions are present at a concentration of about 18 to about 76 millimoles per liter, magnesium ions is in a range of about 2 to about 11 millimoles per liter, and sulfate ions are present at a concentration of about 0.6 to about 2.4 millimoles per liter.

6. The composition of claim 5, wherein the ratio of sodium ions to chloride ions is from about 1.9:1 to about 0.2:1; a second ratio of sodium ions to potassium ions is from about 11.1:1 to about 0.7:1; the ratio of sodium ions to magnesium ions is from about 100:1 to about 4.9:1; and the ratio of sodium ions to sulfate ions is from about 333.3:1 to about 22.5:1.

7. The composition of claim 1, wherein said chloride ions are supplied by a combination of sodium chloride, potassium chloride, and magnesium chloride and said sulfate ions are supplied by magnesium sulfate.

8. A food product comprising the composition of claim 1.

9. The food product of claim 8, wherein said food product comprises chicken broth.

10. The food product of claim 8, wherein said food product comprises a tomato-based vegetable drink.

11. A salt flavor enhancing composition comprising a combination of sodium ions, chloride ions, potassium ions, magnesium ions, and sulfate ions, wherein the ratio of sodium ions to chloride ions is from about 4.5:1 to about 0.1:1; the ratio of sodium ions to potassium ions is from about 30:1 to about 0.3:1; the ratio of sodium ions to magnesium ions is from about 175:1 to about 1.5:1; and the ratio of sodium ions to sulfate ions is from about 850:1 to about 8:1.

12. The composition of claim 11, wherein sodium ions are present at a concentration of about 25 to about 255 millimoles per liter of sodium ions, chloride ions are present at a concentration of about 50 to about 325 millimoles per liter, potassium ions are present at a concentration of about 8.5 to about 100 millimoles per liter, magnesium ions are present at a concentration of about 1.4 to about 15 millimoles per liter, and sulfate ions are present at a concentration of about 0.2 to about 3.5 millimoles per liter.

13. The composition of claim 11, wherein sodium ions are present at a concentration of about 30 to about 250 millimoles per liter, chloride ions are present at a concentration of about 55 to about 320 millimoles per liter, potassium ions are present at a concentration of about 10 to about 95 millimoles per liter, magnesium ions are present at a concentration of about 1.5 to about 14 millimoles per liter, and sulfate ions are at a concentration of about 0.3 to about 3 millimoles per liter.

14. The composition of claim 13, wherein the ratio of sodium ions to chloride ions is from about 5:1 to about 0.1:1; the ratio of sodium ions to potassium ions is from about 25:1 to about 0.3:1; the ratio of sodium ions to magnesium ions is from about 165:1 to about 2:1; and the ratio of sodium ions to sulfate ions is from about 830:1 to about 10:1.

15. The composition of claim 11, wherein sodium ions are present at a concentration about 54 to about 200 millimoles per liter, chloride ions are present at a concentration of about 103 to about 257 millimoles per liter, potassium ions are present at a concentration of about 18 to about 76 millimoles per liter, magnesium ions is in a range of about 2 to about 11 millimoles per liter, and sulfate ions are present at a concentration of about 0.6 to about 2.4 millimoles per liter.

16. The composition of claim 15, wherein the ratio of sodium ions to chloride ions is from about 1.9:1 to about 0.2:1; the ratio of sodium ions to potassium ions is from about 11.1:1 to about 0.7:1; the ratio of sodium ions to magnesium ions is from about 100:1 to about 4.9:1; and the ratio of sodium ions to sulfate ions is from about 333.3:1 to about 22.5:1.

17. The composition of claim 11, wherein said chloride ions are supplied by a combination of sodium chloride, potassium chloride, and magnesium chloride and said sulfate ions are supplied by magnesium sulfate.

18. A food product comprising the composition of claim 11.

19. The food product of claim 18, wherein said food product comprises chicken broth.

20. The food product of claim 18, wherein said food product comprises a tomato-based vegetable drink.

21. A salt flavor enhancing composition consisting essentially from about 75 to 98 percent by weight of a combination of sodium chloride and potassium chloride and from about 2 to 25 percent by weight of a combination of magnesium chloride and magnesium sulfate.

22. The composition of claim 21, wherein the combination of magnesium chloride and magnesium sulfate is from about 5 to 15 percent by weight.

23. The composition of claim 21, wherein the ratio of magnesium chloride to magnesium sulfate is from about 1.7:1 to about 10:1.

24. The composition of claim 21, wherein the ratio of magnesium chloride to magnesium sulfate is from about 3:1 to about 7:1.

25. The composition of claim 21, wherein the combination of sodium chloride and potassium chloride is about 82.82 percent by weight and the combination of magnesium chloride and magnesium sulfate is about 17.17 percent by weight.

26. The composition of claim 21, wherein the combination of sodium chloride and potassium chloride is about 86 percent by weight and the combination of magnesium chloride and magnesium sulfate is about 14 percent by weight.

27. A salt flavor enhancing composition consisting essentially of about 41.41 percent by weight of sodium chloride, about 41.41 percent by weight of potassium chloride, about 14.14 percent by weight of magnesium chloride hexahydrate, and about 3.04 percent by weight of anhydrous magnesium sulfate.

28. A salt flavor enhancing composition consisting essentially of about 50.0 percent by weight of sodium chloride, about 36.0 percent by weight of potassium chloride, about 11.6 percent by weight of magnesium chloride hexahydrate, and about 2.4 percent by weight of anhydrous magnesium sulfate.

29. A salt flavor enhancing composition consisting essentially of a combination of about 66 percent by weight of potassium chloride and about 34 percent by weight of a combination of magnesium chloride and magnesium sulfate.

30. The composition of claim 29, wherein magnesium chloride is present at about 28 percent by weight and magnesium sulfate is present at about 6 percent by weight.

31. The composition of claim 29, wherein the ratio of magnesium chloride to magnesium sulfate is from about 1.7:1 to about 10:1.

32. The composition of claim 29, wherein the ratio of magnesium chloride to magnesium sulfate is from about 3:1 to about 7:1.

33. A salt flavor enhancing composition consisting essentially of about 65.94 percent by weight of potassium chloride, about 28.20 percent by weight magnesium chloride hexahydrate, and about 5.86 percent by weight of anhydrous magnesium sulfate.

34. A food product comprising a combination of about 25 to about 255 millimoles per liter of sodium ions, about 50 to about 325 millimoles per liter of chloride ions, about 8.5 to about 100 millimoles per liter of potassium ions, about 1.4 to about 15 millimoles per liter of magnesium ions, and about 0.2 to about 3.5 millimoles per liter of sulfate ions.

35. The food product of claim 34, wherein the ratio of sodium ions to chloride ions is from about 4.5:1 to about 0.1:1; the ratio of sodium ions to potassium ions is from about 30:1 to about 0.3:1; the ratio of sodium ions to magnesium ions is from about 175:1 to about 1.5:1; and the ratio of sodium ions to sulfate ions is from about 850:1 to about 8:1.

36. The food product of claim 34, wherein sodium ions are present at a concentration of about 30 to about 250 millimoles per liter, chloride ions are present at a concentration of about 55 to about 320 millimoles per liter, potassium ions are present at a concentration of about 10 to about 95 millimoles per liter, magnesium ions are present at a concentration of about 1.5 to about 14 millimoles per liter, and sulfate ions at a concentration of about 0.3 to about 3 millimoles per liter.

37. The food product of claim 36, wherein the ratio of sodium ions to chloride ions is from about 5:1 to about 0.1:1; the ratio of sodium ions to potassium ions is from about 25:1 to about 0.3:1; the ratio of sodium ions to magnesium ions is from about 165:1 to about 2:1; and the ratio of sodium ions to sulfate ions is from about 830:1 to about 10:1.

38. The food product of claim 34, wherein sodium ions are present at a concentration of about 54 to about 200 millimoles per liter, chloride ions are present at a concentration of about 103 to about 257 millimoles per liter, potassium ions are present at a concentration of about 18 to about 76 millimoles per liter, magnesium ions is in a range of about 2 to about 11 millimoles per liter, and sulfate ions are present at a concentration of about 0.6 to about 2.4 millimoles per liter.

39. The food product of claim 34, wherein the ratio of sodium ions to chloride ions is from about 1.9:1 to about 0.2:1; the ratio of sodium ions to potassium ions is from about 11.1:1 to about 0.7:1; the ratio of sodium ions to magnesium ions is from about 100:1 to about 4.9:1; and the ratio of sodium ions to sulfate ions is from about 333.3:1 to about 22.5:1.

40. The food product of claim 34, wherein said chloride ions are supplied by a combination of sodium chloride, potassium chloride, and magnesium chloride and said sulfate ions are supplied by magnesium sulfate.

41. A food product comprising a combination of sodium ions, chloride ions, potassium ions, magnesium ions, and sulfate ions, wherein the ratio of sodium ions to chloride ions is from about 4.5:1 to about 0.1:1; the ratio of sodium ions to potassium ions is from about 30:1 to about 0.3:1; the ratio of sodium ions to magnesium ions is from about 175:1 to about 1.5:1; and the ratio of sodium ions to sulfate ions is from about 850:1 to about 8:1.

42. The food product of claim 41, wherein sodium ions are present at a concentration of about 25 to about 255 millimoles per liter of sodium ions, chloride ions are present at a concentration of about 50 to about 325 millimoles per liter, potassium ions are present at a concentration of about 8.5 to about 100 millimoles per liter, magnesium ions are present at a concentration of about 1.4 to about 15 millimoles per liter, and sulfate ions are present at a concentration of about 0.2 to about 3.5 millimoles per liter.

43. The food product of claim 41, wherein sodium ions are present at a concentration of about 30 to about 250 millimoles per liter, chloride ions are present at a concentration of about 55 to about 320 millimoles per liter, potassium ions are present at a concentration of about 10 to about 95 millimoles per liter, magnesium ions are present at a concentration of about 1.5 to about 14 millimoles per liter, and sulfate ions are present at a concentration of about 0.3 to about 3 millimoles per liter.

44. The food product of claim 43, wherein the ratio of sodium ions to chloride ions is about 5:1 to about 0.1:1; the ratio of sodium ions to potassium ions is from about 25:1 to about 0.3:1; the ratio of sodium ions to magnesium ions is from about 165:1 to about 2:1; and the ratio of sodium ions to sulfate ions is from about 830:1 to about 10:1.

45. The food product of claim 41, wherein sodium ions are present at a concentration of about 54 to about 200 millimoles per liter, chloride ions are present at a concentration of about 103 to about 257 millimoles per liter, potassium ions are present at a concentration of about 18 to about 76 millimoles per liter, magnesium ions is in a range of about 2 to about 11 millimoles per liter, and sulfate ions are present at a concentration of about 0.6 to about 2.4 millimoles per liter.

46. The food product of claim 45, wherein the ratio of sodium ions to chloride ions is from about 1.9:1 to about 0.2:1; the ratio of sodium ions to potassium ions is from about 11.1:1 to about 0.7:1; the ratio of sodium ions to magnesium ions is from about 100:1 to about 4.9:1; and the ratio of sodium ions to sulfate ions is from about 333.3:1 to about 22.5:1.

47. The food product of claim 41, wherein said chloride ions are supplied by a combination of sodium chloride, potassium chloride, and magnesium chloride and said sulfate ions are supplied by magnesium sulfate.

48. A method for preparing a food product including a plurality of food components and a salt flavor enhancing composition comprising the steps of:

measuring a first concentration of sodium ions in said food components of said food product before adding said composition to said food product;

adding a quantity of the composition of claim 30, such that said food product comprises a combination of about 50 to about 325 millimoles per liter of chloride ions, about 8.5 to about 100 millimoles per liter of potassium ions, about 1.4 to about 15 millimoles per liter of magnesium ions, and about 0.2 to about 3.5 millimoles per liter of sulfate ions;

adding a quantity of a source of sodium ions, such that said first concentration is from about 25 to about 255 millimoles per liter.

49. A method for preparing a food product including a plurality of food components and a salt flavor enhancing composition comprising the steps of:

measuring a first concentration of sodium ions in said components of said food product before adding said composition to said food product;

adding a source of sodium ions, such that said first concentration is from about 25 to about 255 millimoles per liter; and adding a quantity of the composition of claim 30, such that said food product comprises a combination of sodium ions, chloride ions, potassium ions, magnesium ions, and sulfate ions, wherein the ratio of sodium ions to chloride ions is from about 4.5:1 to about 0.1:1; the ratio of sodium ions to potassium ions is from about 30:1 to about 0.3:1; the ratio of sodium ions to magnesium ions is from about 175:1 to about 1.5:1; and the ratio of sodium ions to sulfate ions is from about 850:1 to about 8:1.

* * * * *